US012665179B2

(12) United States Patent
Dziekonski

(10) Patent No.: US 12,665,179 B2
(45) Date of Patent: Jun. 23, 2026

(54) SYSTEMS AND METHODS FOR FOURIER TRANSFORM ELECTROSTATIC ION TRAP WITH MICROCHANNEL PLATE DETECTOR

(71) Applicant: DH Technologies Development Pte. Ltd., Singapore (SG)

(72) Inventor: Eric Thomas Dziekonski, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 329 days.

(21) Appl. No.: 18/262,044

(22) PCT Filed: Jan. 19, 2022

(86) PCT No.: PCT/IB2022/050442
§ 371 (c)(1),
(2) Date: Jul. 19, 2023

(87) PCT Pub. No.: WO2022/157641
PCT Pub. Date: Jul. 28, 2022

(65) Prior Publication Data

US 2023/0377866 A1 Nov. 23, 2023

Related U.S. Application Data

(60) Provisional application No. 63/139,985, filed on Jan. 21, 2021.

(51) Int. Cl.
*H01J 49/02* (2006.01)
*H01J 49/40* (2006.01)

(52) U.S. Cl.
CPC .......... *H01J 49/027* (2013.01); *H01J 49/406* (2013.01)

(58) Field of Classification Search
CPC .. H01J 49/4256; H01J 49/025; H01J 49/0031; H01J 49/027; H01J 49/406; H01J 49/282; H01J 49/22
See application file for complete search history.

(56) References Cited

U.S. PATENT DOCUMENTS 6,888,130 B1 * 5/2005 Gonin ................ H01J 49/0095 250/281
8,664,590 B2 * 3/2014 Ding .................. H01J 49/0036 250/281

(Continued)

FOREIGN PATENT DOCUMENTS

WO 2020121167 6/2020

OTHER PUBLICATIONS

Aviv, Ofer, et al. "A bent electrostatic ion beam trap for simultaneous measurements of fragmentation and ionization of cluster ions." Review of Scientific Instruments 79.8 (2008) (Year: 2008).*

(Continued)

*Primary Examiner* — Wyatt A Stoffa
(74) *Attorney, Agent, or Firm* — Lathrop GPM LLP; Malaika O.D. Tyson; Jason Kuchar

(57) ABSTRACT

A Fourier Transform electrostatic linear ion trap (ELIT) is disclosed with an electron multiplier detector comprising one of a microchannel plate and a channel electron multiplier. An (ELIT) is provided comprising a central axis along which ions travel; an image current detector disposed at least partially around the central axis of the ELIT; and an electron multiplier detector arranged in an opening of the image current detector, the electron multiplier detector being operable to receive ions deflected from the central axis. The electron multiplier detector may have a front surface that is perpendicular to the central axis of the ELIT. The electron multiplier detector may comprise two separate elements at non-normal angles to the central axis of the ELIT. The image (Continued)

9D)

9E)

current detector may comprise a cylinder with the opening on one side in which the electron multiplier detector is arranged, a U-shape, or a half-tube detector.

22 Claims, 15 Drawing Sheets

(56) References Cited

U.S. PATENT DOCUMENTS

| | | | | |
|---|---|---|---|---|
| 9,779,930 | B2 * | 10/2017 | Guna | H01J 49/063 |
| 10,074,529 | B2 * | 9/2018 | Collings | H01J 49/0031 |
| 10,153,149 | B2 * | 12/2018 | Verenchikov | H01J 49/406 |
| 10,784,098 | B2 * | 9/2020 | Chernushevich | H01J 49/405 |
| 11,011,364 | B2 * | 5/2021 | Rusinov | H01J 49/406 |
| 11,081,332 | B2 * | 8/2021 | Verenchikov | H01J 49/0036 |
| 11,205,568 | B2 * | 12/2021 | Verenchikov | H01J 49/4245 |
| 11,232,941 | B2 * | 1/2022 | Jarrold | H01J 49/4265 |
| 12,494,355 | B2 * | 12/2025 | Räther | H01J 49/0036 |
| 12,531,223 | B2 * | 1/2026 | Le Blanc | H01J 49/0045 |
| 2011/0240845 | A1 * | 10/2011 | Ding | H01J 49/027 250/282 |
| 2012/0056087 | A1 * | 3/2012 | Ahn | H01J 49/0022 250/288 |
| 2012/0091332 | A1 | 4/2012 | Makarov | |
| 2013/0313425 | A1 * | 11/2013 | Verenchikov | H05K 3/027 250/288 |
| 2019/0295835 | A1 * | 9/2019 | Verenchikov | H01J 49/0036 |
| 2019/0304764 | A1 * | 10/2019 | Böhm | H01J 49/0031 |
| 2020/0411299 | A1 * | 12/2020 | Baba | H01J 49/065 |

OTHER PUBLICATIONS

International Search Report and Written Opinion corresponding to International Patent Application No. PCT/IB2022/050442, mailed Apr. 4, 2022.

PCT, “International Preliminary Report on Patentability,” regarding Application No. PCT/IB2022/050442, 8 pages, dated Jul. 23, 2023.

* cited by examiner

9E)

9D)

SYSTEMS AND METHODS FOR FOURIER TRANSFORM ELECTROSTATIC ION TRAP WITH MICROCHANNEL PLATE DETECTOR

CROSS-REFERENCE TO RELATED APPLICATIONS/INCORPORATION BY REFERENCE

The present application is filed pursuant to 35 U.S.C. 371 as a U.S. National Phase application of International Patent Application No. PCT/IB2022/050442, which was filed Jan. 19, 2022 claiming the benefit of priority from U.S. Provisional patent application Ser. No. 63/139,985, filed on Jan. 21, 2021, the entire contents of which are hereby incorporated by reference herein.

BACKGROUND

Conventional approaches for electrostatic trap detectors may be costly, cumbersome, and/or inefficient—e.g., they may be complex and/or difficult to implement, and may exhibit poor capture efficiency, low ion capacity, highly non-linear or asymmetrical extraction fields, slow rise times of extraction voltages, multiple tank circuits, and ions trapped within fringing fields.

SUMMARY

Figure 1:
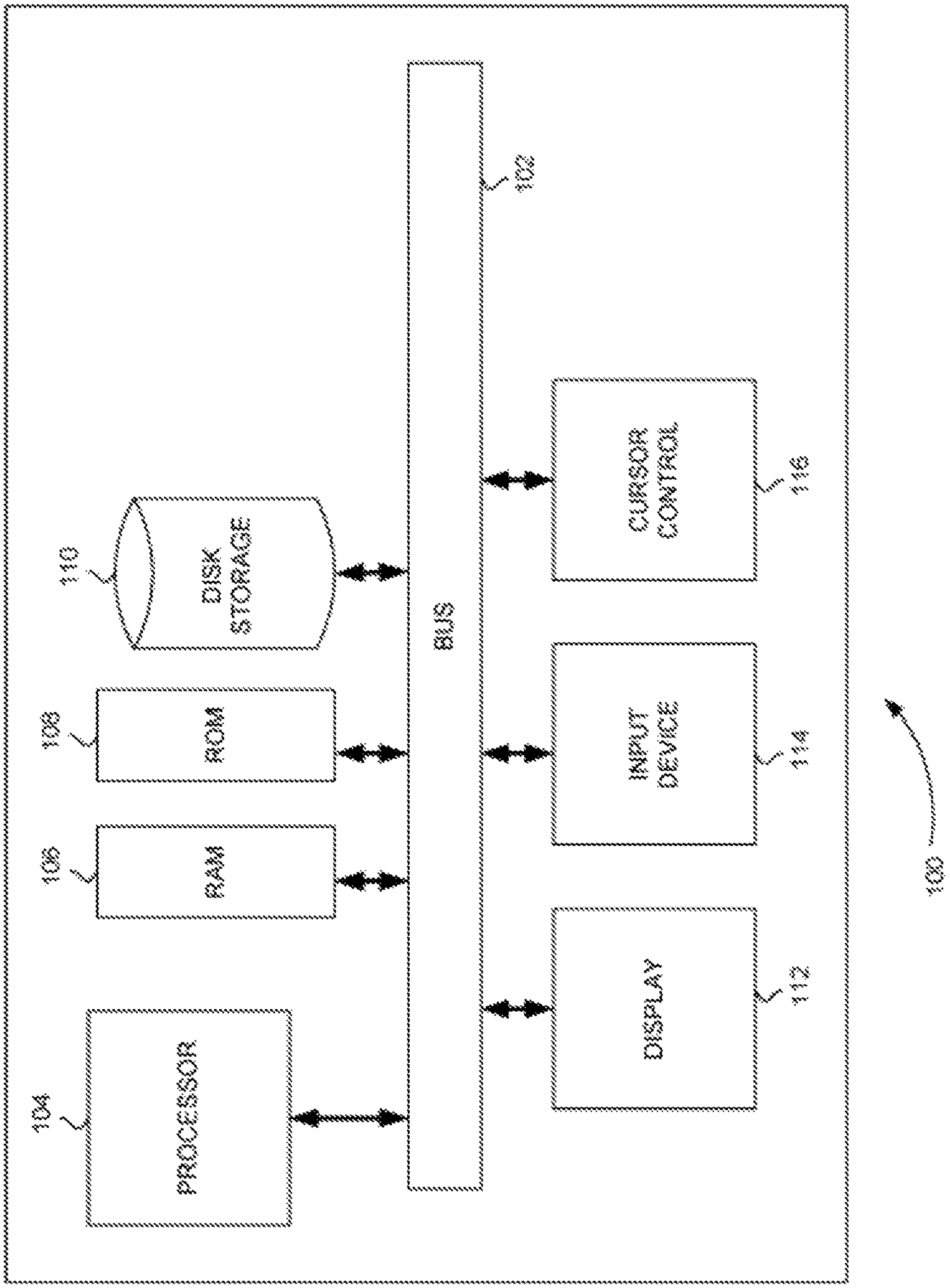
FIG. 1 is a block diagram that illustrates a computer system, upon which embodiments of the present teachings may be implemented.

A system and/or method for a Fourier Transform electrostatic linear ion trap (FT-ELIT) with and electron multiplier detector. The electron multiplier detector can comprise one of a microchannel plate detector and a channel electron multiplier detector, substantially as shown in and/or described in connection with at least one of the figures, as set forth completely in the claims.

In various embodiments, a mass spectrometer system is provided comprising an electrostatic linear ion trap (ELIT) comprising a central axis along which ions travel; an image current detector disposed at least partially around the central axis of the ELIT; and an electron multiplier detector arranged in an opening of the image current detector, the electron multiplier detector being operable to receive ions deflected from the central axis.

In various aspects, the electron multiplier detector comprises one of a microchannel plate (MCP) and a channel electron multiplier (CEM). In various aspects, the electron multiplier detector has a front surface that is perpendicular to the central axis of the ELIT. In various aspects, the electron multiplier detector comprises two separate elements at non-normal angles to the central axis of the ELIT. In various aspects, the image current detector comprises a cylinder with the opening on one side in which the electron multiplier detector is arranged. In various aspects, the image current detector comprises a U-shape. In various aspects, the image current detector comprises a half-tube detector. In various aspects, the image current detector comprises an extended half-tube detector. In various aspects, the ELIT is operable to dissociate ions at an exit end of the ELIT for detection by the electron multiplier detector or image current detector. In various aspects, the electron multiplier detector is arranged midway between an inlet and an outlet of the ELIT. In various aspects, the ELIT is operable to pass ions not deflected to the electron multiplier detector to subsequent optics. In various aspects, a focusing element is situated between the image current detector and the electron multiplier detector.

In various embodiments, a method is provided for mass spectrometry, the method comprising in an electrostatic linear ion trap (ELIT) comprising an image current detector disposed at least partially around a central axis of the ELIT and an electron multiplier detector arranged in an opening of the image current detector, introducing ions into the ELIT and deflecting at least a portion of the ions into the electron multiplier detector. The electron multiplier detector comprises one of a microchannel plate (MCP) and a channel electron multiplier (CEM).

In various aspects, the method provides measuring a charge on the image current detector due to the ions traveling along the central axis. In various aspects, the electron multiplier detector has a front surface that is perpendicular to the central axis of the ELIT. In various aspects, the electron multiplier detector comprises two separate elements at non-normal angles to the central axis of the ELIT. In various aspects, the image current detector comprises a cylinder with the opening on one side in which the electron multiplier detector is arranged. In various aspects, the image current detector comprises a U-shape. In various aspects, the image current detector comprises a half-tube detector. In various aspects, dissociating ions at an exit of the ELIT for detection by the electron multiplier detector or image current detector. In various aspects, the electron multiplier detector is arranged midway between an inlet and an outlet of the ELIT. In various aspects, passing ions not deflected to the electron multiplier detector to optics that are subsequent to the ELIT. In various aspects, focusing ions onto the electron multiplier detector using a focusing element located between the image current detector and the electron multiplier detector.

In various embodiments, the electron multiplier detector does not terminate the ion path allowing for additional ion optics or sources of fragmentation to be placed after the ELIT. In various embodiments, the electron multiplier can perform automatic gain control to the ion packet analyzed in the ELIT. In various embodiments, more than one electron multiplier detector can be included in the central housing. In various aspects, the electron multiplier detectors can be tilted in different directions to minimize the peak width when electrons are deflected from the right or left. In various aspects, the detectors can have similar or different setups for various parameters, including gain and polarities. In various aspects, ions can be deflected into more than one electron multiplier detector to increase detector lifetime and linear dynamic range.

These and other advantages, aspects and novel features of the present disclosure, as well as details of an illustrated embodiment thereof, will be more fully understood from the following description and drawings.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

The current state of product development, and scientific advancement in general, for example in the life sciences, is hampered by current systems and methods, adding literally years to product and/or scientific development cycles.

FIG. 1 is a block diagram that illustrates a computer system, upon which embodiments of the present teachings may be implemented. Computer system 100 may comprise a bus 102 or other communication mechanism for communicating information, and a processor 104 coupled with bus 102 for processing information. Computer system 100 may also comprise a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 may comprise a read only memory (ROM) 108 or other static storage device coupled to bus 102 for storing static information and instructions for processor 104. A storage device 110, such as a magnetic disk or optical disk, may be provided and coupled to bus 102 for storing information and instructions.

Computer system 100 may be coupled via bus 102 to a display 112, such as a light emitting diode (LED) or liquid crystal display (LCD), for displaying information to a computer user. An input device 114, including alphanumeric and other keys, may be coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 may be connected to one or more other computer systems, like computer system 100, across a network to form a networked system. The network may comprise a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a communications link. A modem local to computer system 100 can receive the data on the link and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method may be stored on a computer-readable medium. The computer-readable medium may comprise a device that stores digital information. For example, a computer-readable medium includes a compact disc read-only memory (CD-ROM), universal serial bus (USB) drive, or other storage device as is known in the art for storing software. The computer-readable medium may be accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

In an example scenario, the computer system 100 may be operable to control a mass spectrometer system, such as the system described with respect to FIGS. 2-12. Accordingly, the computer system 100 may be operable to control circuitry for applying RF and DC voltages to segmented quadrupoles for injecting ions into subsequent blocks for processing. The computer system 100 may also be operable for reading measurements based on the injected ions, such as detector outputs, for example.

Figure 2:
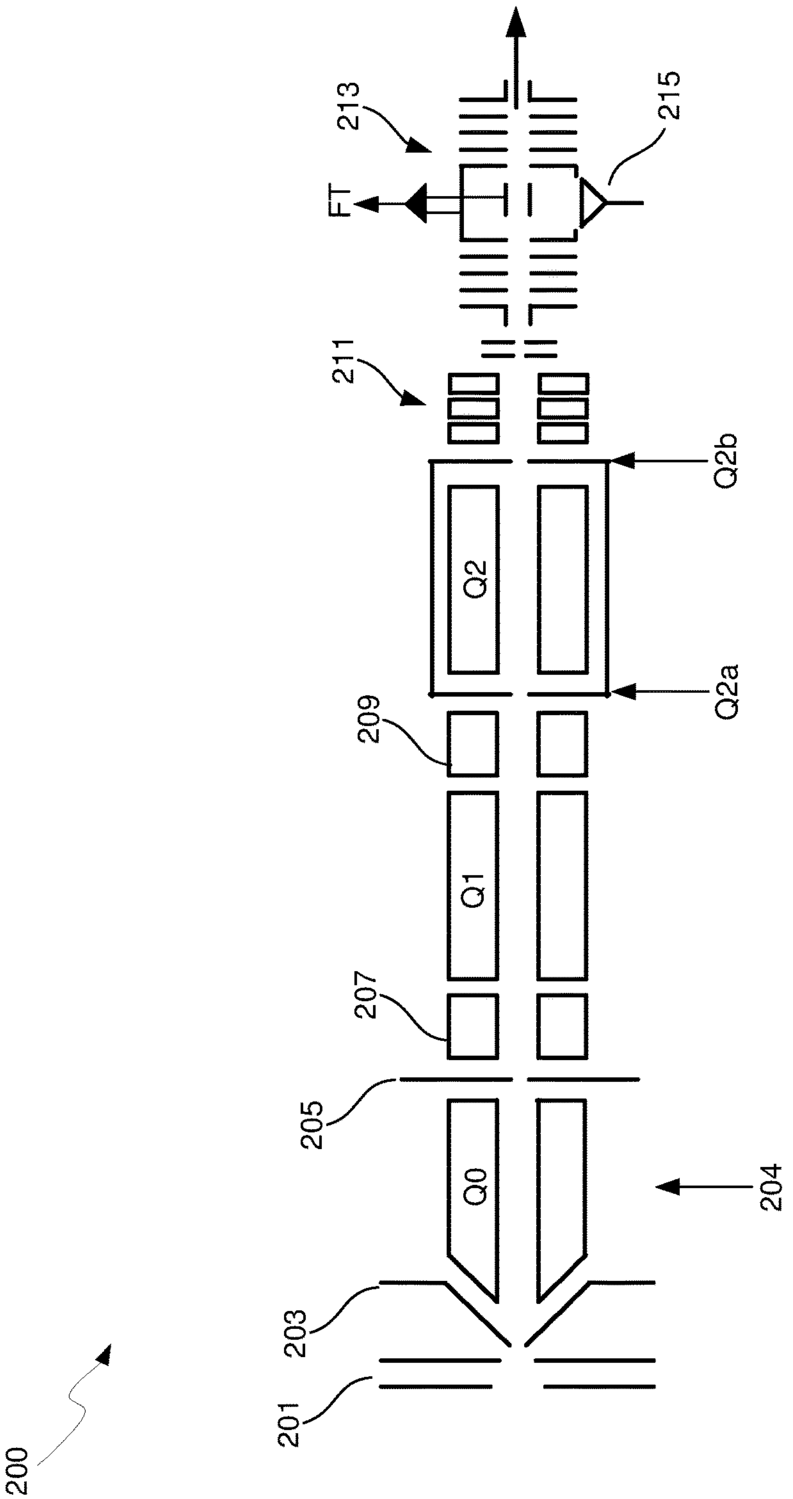
FIG. 2 is a schematic diagram of a mass spectrometer system, in accordance with an example embodiment of the disclosure.

FIG. 2 is a schematic diagram of a mass spectrometer system, in accordance with an example embodiment of the disclosure. Referring to FIG. 2, there is shown mass spectrometer 200 comprising quadrupoles Q0, Q1, and Q2, orifice plates 201 and 205, skimmer 203, additional stubby rods 207 and 209, focusing lens 211, electrostatic linear ion trap (ELIT) 213, and micro-channel plate (MCP) detector 215.

The quadrupoles Q0-Q2 comprise four electrodes/poles that may be biased with DC and/or AC voltages for capturing, confining, and ejecting charged ions. The electrodes may be cylindrical or may have a hyperbolic shape, for example.

The orifice plates 201 and 205 may comprise plates with an orifice formed therein for allowing ions to pass through but with the orifice being small enough to enable a pressure difference between chambers, such as between vacuum chamber 204 and other higher pressure regions of the mass spectrometer 200.

The stubby rods 207 and 209 may comprise shorter rods, as compared to Q0-Q2, that guide ions between Q0 and Q2, and may also be biased with DC and/or RF fields for transporting ions confined along a central axis. The ELIT 213 may comprise electrode plates at the entrance and exit sides of the ELIT 213, with a pickup electrode centered within the electrode plates. In one embodiment, the pickup electrode may comprise a cylindrical metal tube coupled to external electronics, and may be operable to become charged due to charged ions travelling through the pickup electrode along the axis of the cylinder. The detector 215 may comprise a microchannel plate (MCP) detector, and may be configured in an opening in the pickup electrode as opposed to being placed at the output of the ELIT 213 as conventionally done.

The electrode plates have holes for allowing ions to pass, where the plates are biased such that the ions oscillate radially and axially with radial oscillation being the minor of the two, and are also reflected back in the axial direction, thereby causing the ions to oscillate within the ELIT. These plates are also known as reflectron plates. As ions pass through the pickup electrode, a current is induced, which may be sensed and amplified through a Fourier Transform analysis, for example. In addition, the detector 215 may comprise an electron multiplier, such as a microchannel plate (MCP) or channel electron multiplier (CEM) for example, that may be used to detect ions deflected from the main axis of the ELIT 213. The detector 215 may be located within the central housing, or "field-free region," of the ELIT 213. The Fourier transform detector geometry can be altered in such a way that ions can be deflected into the electron multiplier, while also being used to collect the image charge/current of an ion packet for FT-MS.

During operation of the mass spectrometer 200, ions may be admitted into vacuum chamber 204 through orifice plates 201 and skimmer 203. Ions may be collisionally cooled in Q0, which may be maintained at a low pressure, such as less than 100 mTorr, for example. Quadrupole Q1 may operate as transmission RF/DC quadrupole mass filter, and may be segmented for injecting highly confined ion packets into Q2. Q2 may comprise a collision cell in which ions collide with a collision gas, such as nitrogen, for example, to be fragmented into products of lesser mass. Ions may be trapped radially in any of Q0, Q1, and Q2 by RF voltages applied to the rods and axially by DC voltages applied to the end aperture lenses or orifice plates. In addition, Q2 may comprise orifice plates Q2*a* and Q2*b* to enable a pressure difference between the higher pressure of Q2 and other regions of mass spectrometer 200.

According to aspects of the present disclosure, an auxiliary RF voltage may be provided to end rod segments, end lenses, and/or orifice plates of one of the rod sets to provide a pseudo potential barrier. By this means, both positive and negative ions may be trapped within a single rod set or cell. Typically, positive and negative ions would be trapped within the high pressure Q2 cell. Once the positive and negative ions within Q2 have reacted, they can be axially ejected through ELIT 213 for further analysis, and and/or deflected to the detector 215, depending on the analysis being conducted. The detector 215 may be utilized to tune the mass spectrometer system, with the high speed and high sensitivity of MCP detectors, plate potentials may be adjusted to ensure peak separation of similar mass ions.

In the example shown in FIG. 2, the detector 215 is located essentially midway between the input and the output of the ELIT 213, such that it does not terminate the mass spectrometer while maintaining the ability to perform Fourier transform (FT) based mass analysis. When performing FT mass analysis (broad-band mass analysis), the electron multiplier detector, for example, a MCP detector, is often only used as an indicating device, allowing the user to easily tune the ion path and injection conditions with single ion sensitivity. Therefore, it is not critical that vector normal to the plane of the electron multiplier, i.e., MCP be parallel with the ELIT axis, as it would conventionally be to allow the time-of-flight focus to be at the plane of the MCP. Instead, if used simply as an indicating device, the electron multiplier, i.e., MCP detector can take on any orientation so long as ions can be deflected into the electron multiplier with sufficient energy to generate an electron cascade.

FIGS. 3A-3E illustrate various operational modes for a mass spectrometer with perpendicular detector configuration, in accordance with an example embodiment of the disclosure. Referring to FIGS. 3A-3E, there is shown ELIT 313, detector 315, and image charge/current detection element 317 where each figure illustrates one of five different modes of operation using the detector 315, depicted as an MCP electron multiplier in this example, located within the central housing of the ELIT 313: 3A) Time-of-flight, 3B) reflectron time-of-flight, 3C) Ion transmission, 3D) Multiple-reflection time-of-flight, and 3E) Fourier Transform analysis. A sixth mode may be compatible with FIG. 3E, where ions may be released towards the left or right of the ELIT 313 after FT analysis and captured in some ion optical device for further processing, since FT analysis is non-destructive, enabling such further processing.

When ions are directed along the axis of the ELIT 313, the central housing of the ELIT 313, front plate of the detector 315, and image charge/current detection element 317 may be biased to the same potential, although it may be beneficial to bias them differently to steer the ion beam. FIGS. 3A-3E represent a cross section of ELIT 313 and indicate that the bottom of the image current detector 317 is removed so that ions can be deflected to the detector 315. Different image current detector 317 geometries may comprise plate, half-tube, extended half-tube, although there are many other possible geometries.

It should be noted that in FIGS. 3A-3E, the vector normal to the surface of the detector 315 is perpendicular to the ELIT 313 axis. In this case, roughly equivalent peak widths may be expected if ions are deflected from the left or right. If, however, ions are only to be deflected from a single direction, the detector 315 face could be tilted towards that side, reducing time-of-flight disparities due to the trajectory of the ions, thereby reducing the peak widths in time.

Figures 3A, 3B, 3C, 3D:
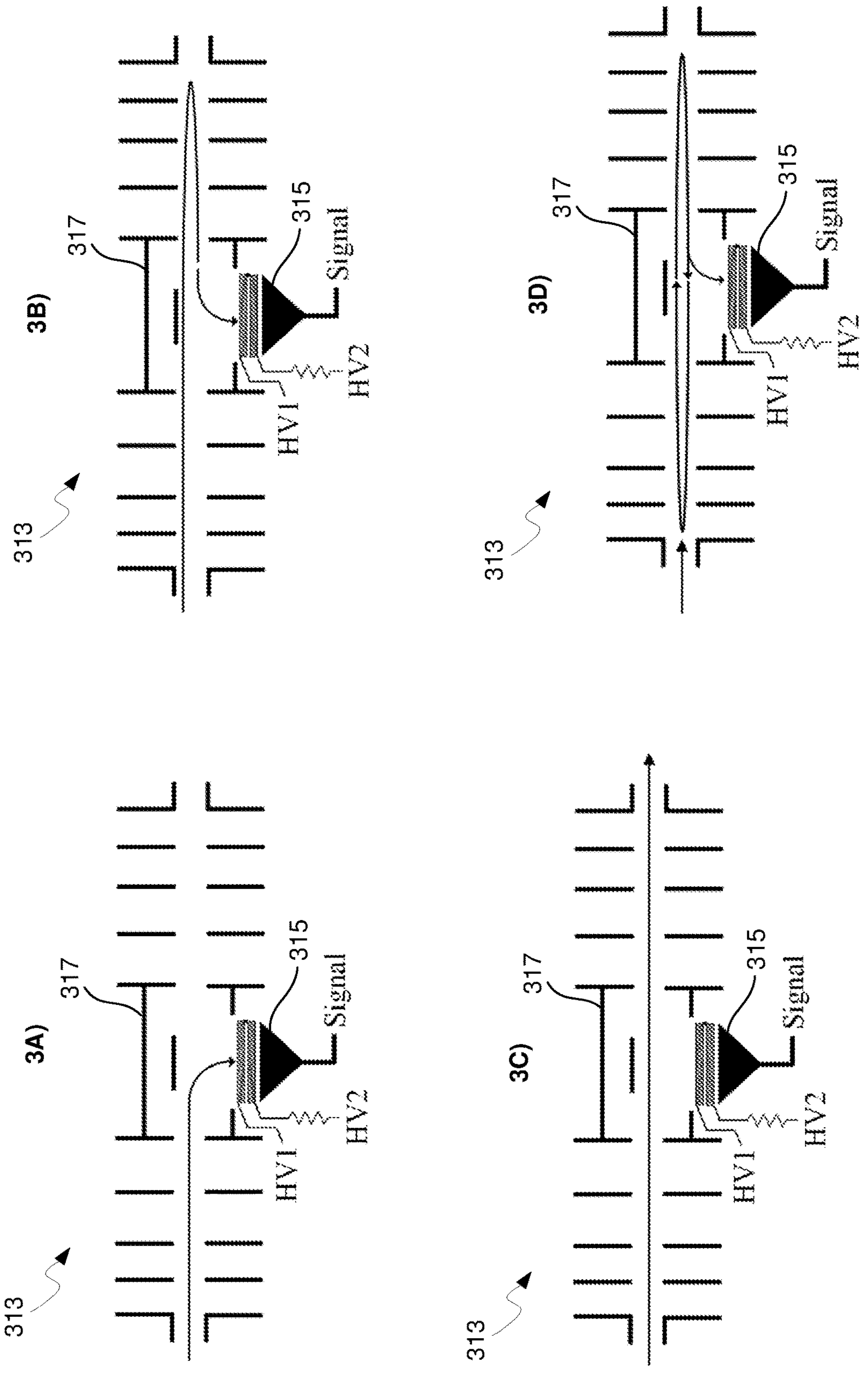
FIGS. 3A-3E illustrate various operational modes for a mass spectrometer with perpendicular detector configuration, in accordance with an example embodiment of the disclosure.
Figure 3E:
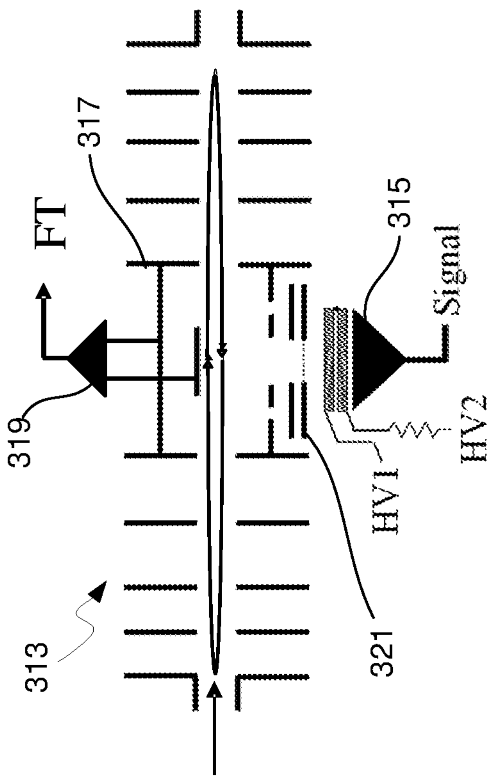

FIGS. 3A-3D show the ELIT 313 without Fourier Transform circuitry coupled to the image current detector 317 as these examples represent time-of-flight measurements and ion transmission. FIG. 3E illustrates Fourier Transform analysis of charge induced on the image current detector 317 enabled by amplifier 319, where a time-domain signal generated by the image current detector 317 may be amplified by the amplifier 319 before undergoing Fourier Transform analysis thereby generating a frequency-domain signal, where each frequency corresponds to a different ion m/z ratio. Signal peaks at a particular frequency therefore indicate the presence of an ion of that m/z ratio. In the example shown, the ELIT 313 is in reflectron mode with ions trapped in the ELIT 313.

FIG. 3E also comprises focusing element 321, which may comprise additional ion optical elements placed between the detector housing and electron multiplier 315 to better shape the deflected beam. The detector 315, electron multiplier, does not need to be the first element encountered by deflected ions. The focusing element 321 may comprise additional lenses, grids, etc. such that the detector 315 does not need to have its voltage pulsed, but rather the focusing element 321.

Figures 4A, 4B, 4C:
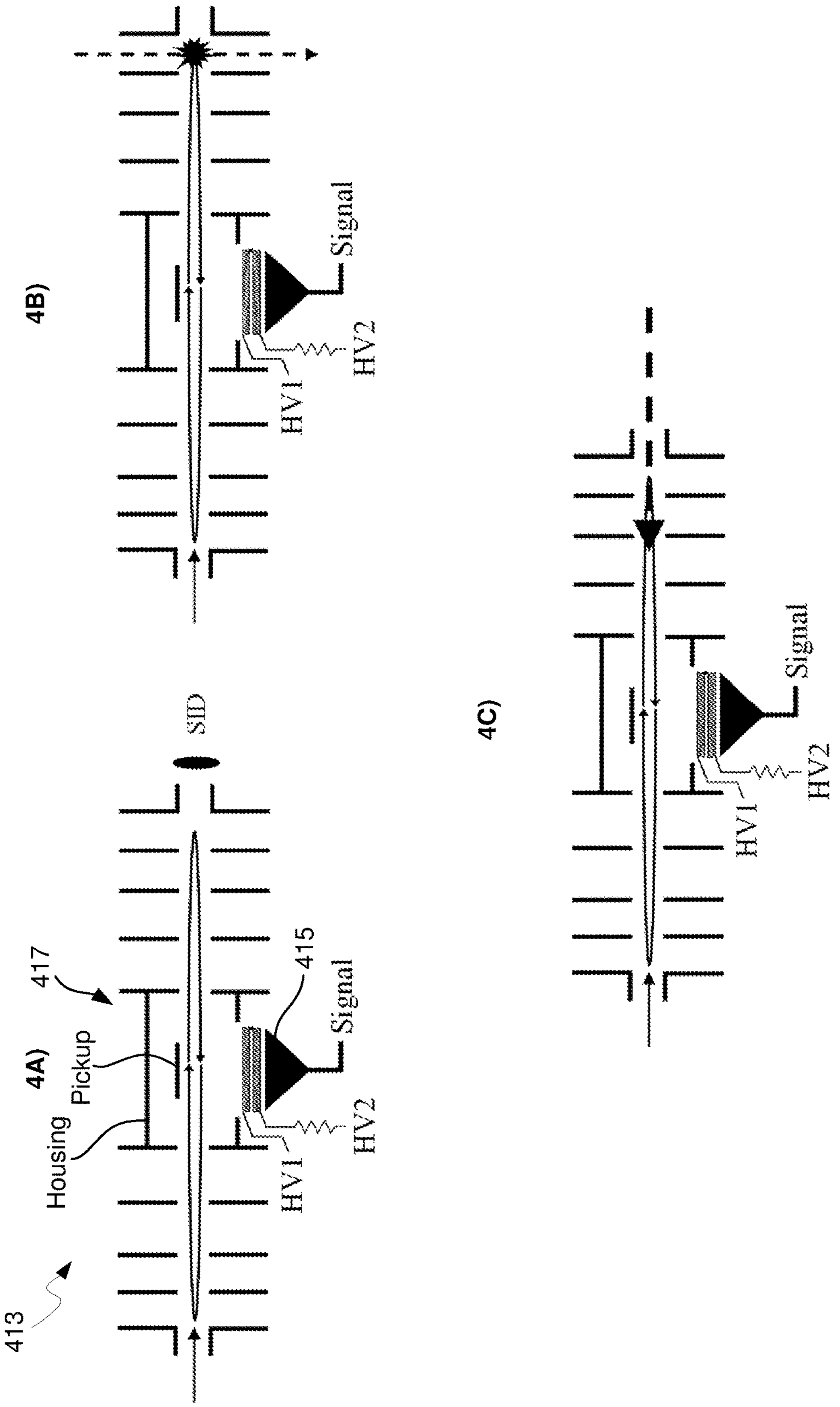
FIGS. 4A-4C illustrate further processing options enabled by locating the electron multiplier detector within the field-free zone of the electrostatic ion trap, in accordance with an example embodiment of the disclosure.

FIGS. 4A-4C illustrate further processing options enabled by locating the electron multiplier detector within the field-free zone of the electrostatic ion trap, in accordance with an example embodiment of the disclosure. By locating the detector 415 between the input and output of the ELIT 413 as opposed to at the exit as is conventionally done, ions can be transmitted through the ELIT 413 for further processing in downstream ion optics (quad, TOF, collision cell, etc.) while also diverting some ions to the detector 415. In this case, the ELIT 413 and detector 415 no longer need be the terminal elements in the mass spectrometer and surface-induced dissociation or on-axis photo/electron fragmentation may be enabled.

FIG. 4A illustrates surface-induced dissociation, where ions are dissociated when interacting with a surface after acceleration from the ELIT 413. FIGS. 4B and 4C show photo-electron dissociation, where in FIG. 4B, photons impinge on the ions from a direction perpendicular to the ion beam path while in FIG. 4C, the fragmentation occurs via on-axis photons, from the ELIT 413 exit in this case.

Figures 5A, 5B:
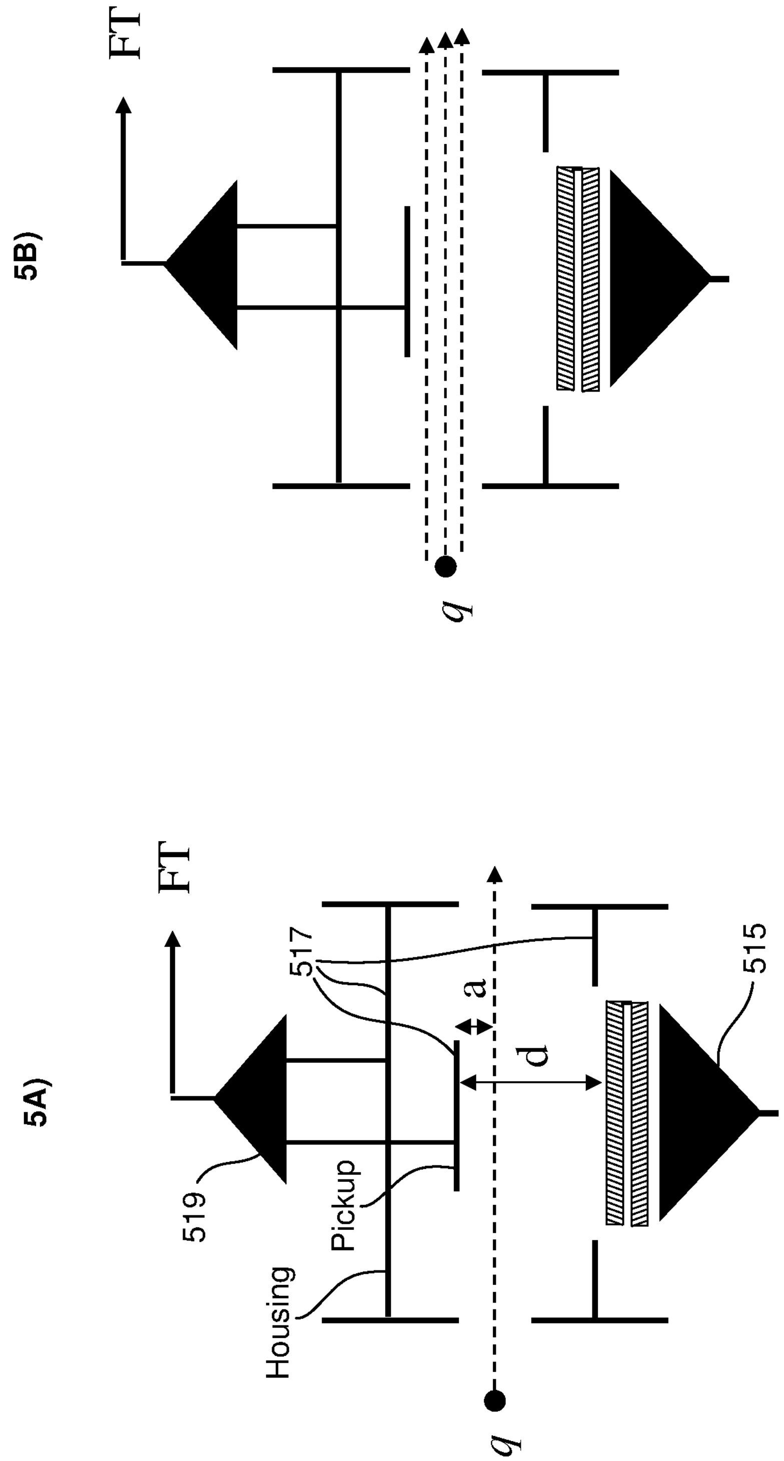
FIGS. 5A and 5B illustrate an image current detector and microchannel plate detector for modeling image charge current for various ion paths, in accordance with an example embodiment of the disclosure

FIGS. 5A and 5B illustrate an image current detector and electron multiplier detector, i.e., microchannel plate detector, for modeling image charge current for various ion paths, in accordance with an example embodiment of the disclosure. For clarity, FIGS. 5A to 11C show only the internal center portion of the ELIT, with just the image current detectors, plate detectors, and FT amplifiers at most. Referring to FIG. 5A, for the sake of calculation, considering that the ELIT represented by the cross-sectional view of FIGS.

2-4, i.e. the ELIT not being cylindrically symmetric, but instead is a two-dimensional ion trap, the plate inner conductor of the image current detector 517 may be represented by a "wire," i.e., only existing on one side of the ion path, and is shown coupled to amplifier 519. In this situation, the image charge induced on the detector 517 may be proportional to 1-a/d, where a is the distance from the central axis to the plate detector, i.e., the inner conductor of the image current detector 517, and d is the total distance between the MCP detector 515 and plate detector. Therefore, the closer the ion gets to the image current detector plate, the more charge it induces.

As ions generally do not travel directly down the exact central axis of the ELIT, but cover a distribution of radial positions as shown in FIG. 5B, the image charge induced by a single ion is not constant from pass to pass, varying with a. This can create unwanted additional noise in the frequency spectrum. Note that this is a greatly simplified treatment and assumes that the total charge is distributed between the MCP detector 515 and image current detector 517 only, and that no charge is induced on the other elements.

Figures 6A, 6B:
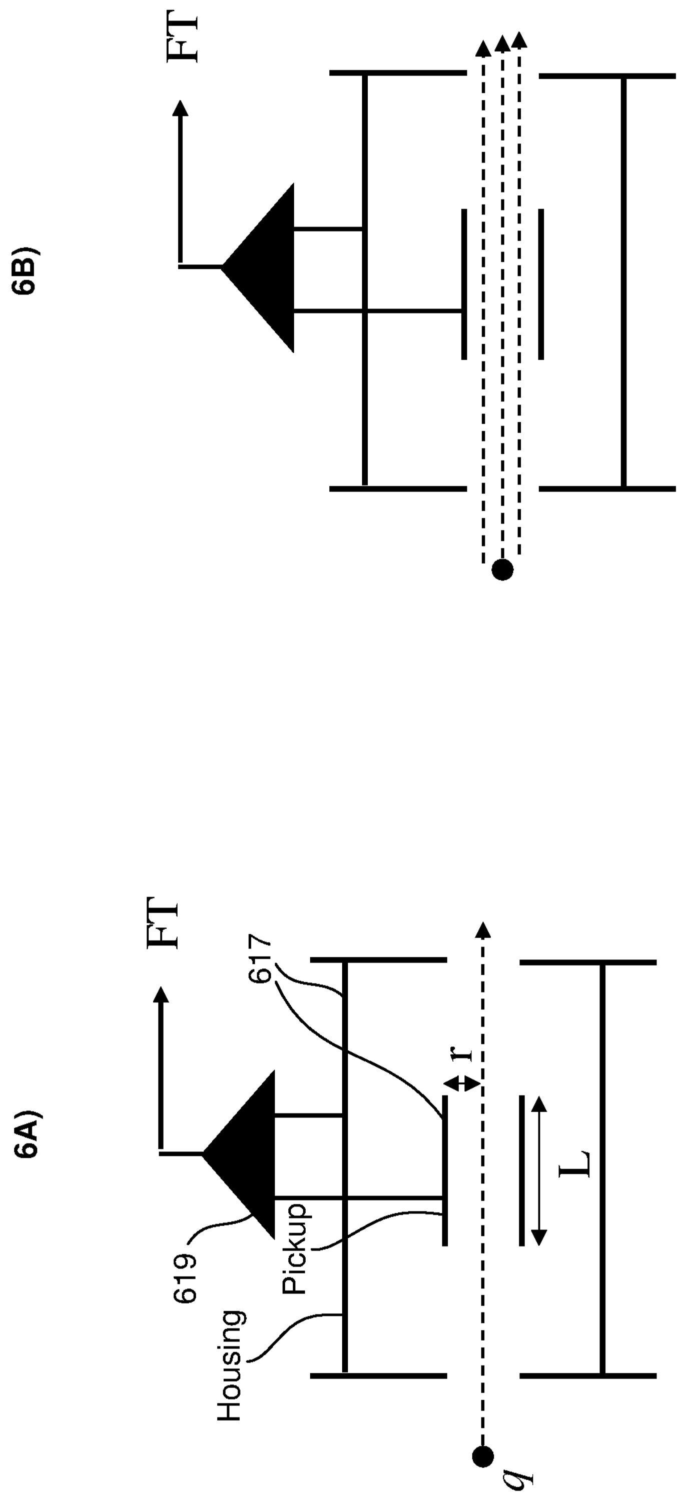
FIGS. 6A and 6B illustrate a cylindrical image current detector, in accordance with an example embodiment of the disclosure.

FIGS. 6A and 6B illustrate a cylindrical image current detector, in accordance with an example embodiment of the disclosure. In this example, the cylindrical image current detector 617 is fully around the ion axis, and in this 2D cross-section is shown by the two lines of length L, the inner and outer terminals coupled to amplifier 619. If an ion deviates from the center, it gets further from one side of the pickup tube, but closer to the other. In this respect, the effects cancel each other and the induced image charge is independent of the radial position of the ion as it travels through the detector.

The different detector geometries may be simulated with the simulation output being the charge induced when the electron multiplier detector, such as an MCP detector is included in the central housing with an image charge detection element, and the MCP detector being in the field-free region. The simulations may be carried out in 3D space with x/y symmetry using a single positive ion starting at the center of the ELIT. In this example, the simulated central housing may be 25.4 mm long and with an inner diameter 33 mm, and where applicable the MCP detector may have an outer diameter of 10 mm and placed such that the center of the front plate that is exposed to ions may be situated along the inner diameter of the central housing.

Figures 7A, 7B, 7C:
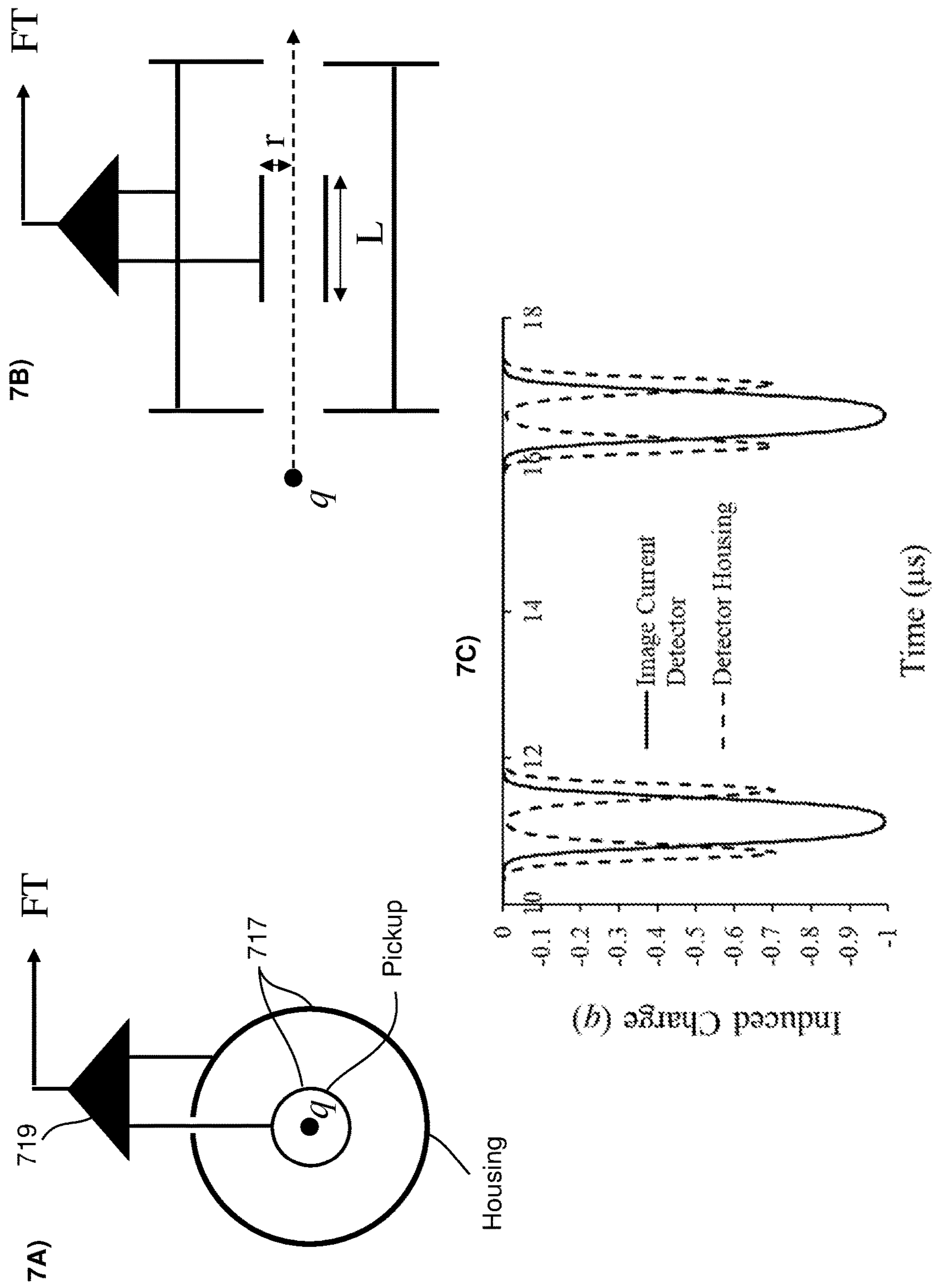
FIGS. 7A-7C illustrate a cylindrical image current detector and a simulation of resulting induced charge, in accordance with an example embodiment of the disclosure.

FIGS. 7A-7C illustrate a cylindrical image current detector and a simulation of resulting induced charge, in accordance with an example embodiment of the disclosure. FIG. 7A illustrates a cross-sectional view of the image current detector 717, with the perspective being from the ion path point-of-view, coupled to amplifier 719. The ion is represented by "q" centered in the image current detector 717. FIG. 7B shows a cross-sectional view from the side of the image current detector 717, perpendicular to the ion path, represented by the dashed line at a distance "r" from one side of the image current detector 717, and the inner portion of the image current detector 717 having a length "L".

FIG. 7C illustrates induced charge versus time in the image current detector 717 and in the field-free region, or the detector housing. In the figures, only the detector housing is shown as none of the reflectron plates on either side of the field free region are depicted here. Anything within the housing of the image current detector 717 may be considered "field-free" although not technically 100% field-free. The end plates of the central housing, which are shown on each side of FIG. 7B, define the start and end of the field-free region. In an example scenario, the field free region, i.e., the detector housing, and image current detection tube may be held at the same nominal potential. This potential may be ground, or floated to some value, e.g. −2 kV. The detection tube may be capacitively coupled to the input of the amplifier 719, so that the amplifier does not need to be floated. The inner tube accumulates charge which is sensed as a current at the input of the amplifier 719. The second terminal of the op-amp may be held at ground, thus the induced image current is measured relative to ground and not the detector housing.

This result shows the conventional cylindrically symmetric ELIT and image current detector in order to collect baseline data for comparison with other structures and confirm that the counter charge is induced on the image current detector. In this example, the simulated detector length L is 15 mm with an inner diameter of 8.25 mm. As can be seen in FIG. 7C, nearly the full counter charge is induced on the image current detector, with some small amount (~1%) being left on the central housing, as the pickup tube would need to be infinitely long to collect all of the counter charge.

Figures 8A, 8B, 8C:
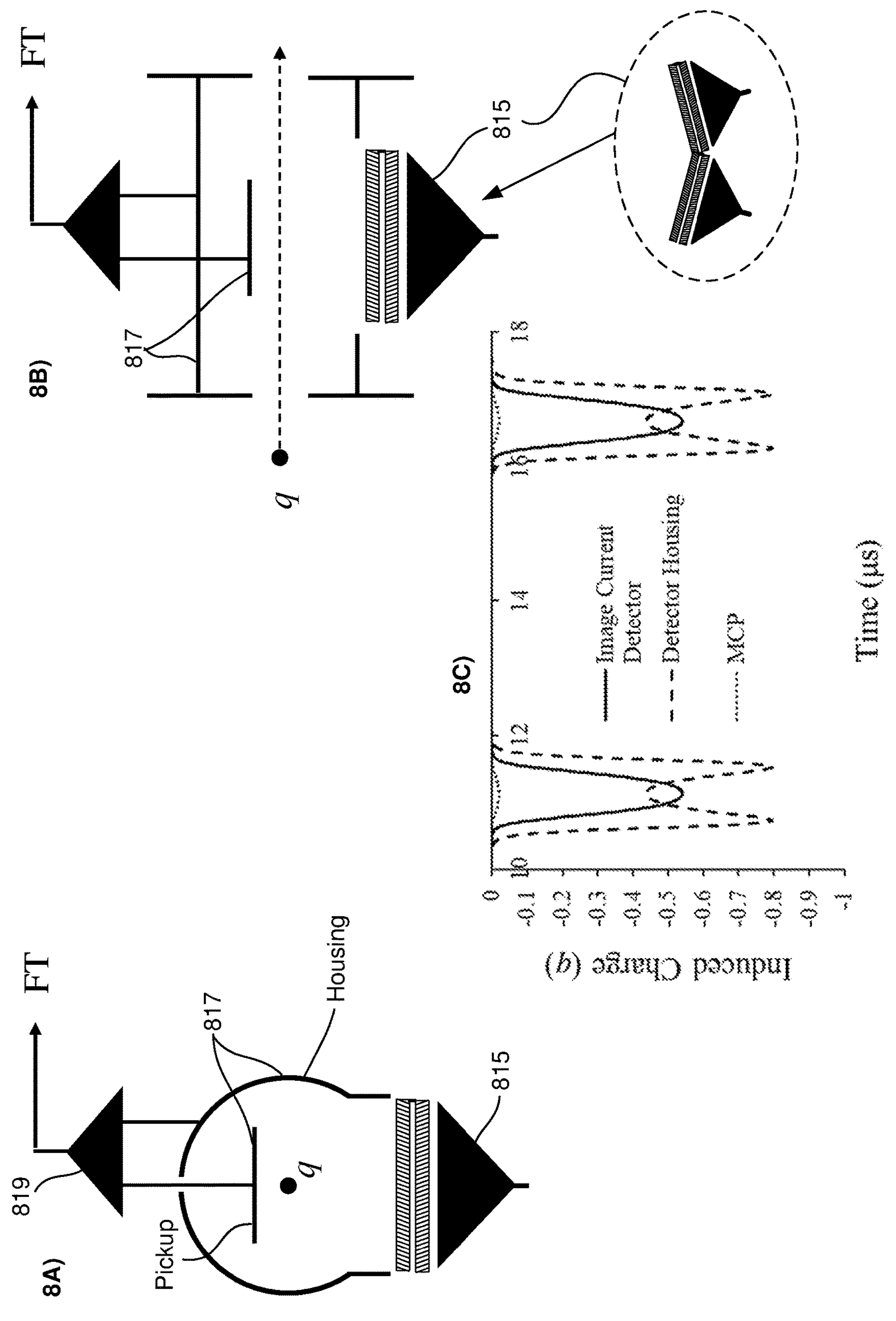
FIGS. 8A-8C illustrate a modified cylindrical image current detector and a flat plate detector with a simulation of resulting induced charge, in accordance with an example embodiment of the disclosure.

FIGS. 8A-8C illustrate a modified cylindrical image current detector and a flat plate detector with a simulation of resulting induced charge, in accordance with an example embodiment of the disclosure. FIG. 8A illustrates a cross-sectional view of the image current detector 817, with the perspective being from the ion path point-of-view, coupled to amplifier 819. There is also shown detector 815, which may comprise an electron multiplier such as a CEM or MCP detector, for example. The ion is represented by "q" centered in the image current detector 817. FIG. 8B shows a cross-sectional view from the side of the image current detector 817, perpendicular to the ion path, represented by the dashed line and shows detector 815 within an opening in the housing of the image current detector 817. With the placement of the detector 815 on the side of the ion axis, the detector 815 is therefore not a terminal element in the mass spectrometer and surface-induced dissociation photo/electron fragmentation is enabled.

This example represents a cylindrical image current detector housing with an opening for detector 815, which in this example is 19 mm wide, 1.25 mm thick, 15 mm long, and spaced 4.125 mm from the ion axis. In this example the image current detector pickup is a planar structure as opposed to a cylindrical tube. In another example embodiment, the detector 815 may comprise two elements, as shown in the inset of FIG. 8B, such that each element is slanted at an off-normal angle to accept ions from a different direction traveling along the axis of the ELIT, thereby reducing the deflection angle requirements. As shown in the induced charge versus time plot of FIG. 8C, the induced signal, indicated by the "Image Current Detector" line, drops by almost a factor of 2, with much more charge being induced on the central housing, as indicated by the "Detector Housing" line. In this configuration, only ~2% of the image charge is induced on the MCP. This configuration may lead to a significant decrease in the S/N, but may also be highly dependent on the radial position of the ion as it passes the detection plate.

Figures 9A, 9B, 9C:
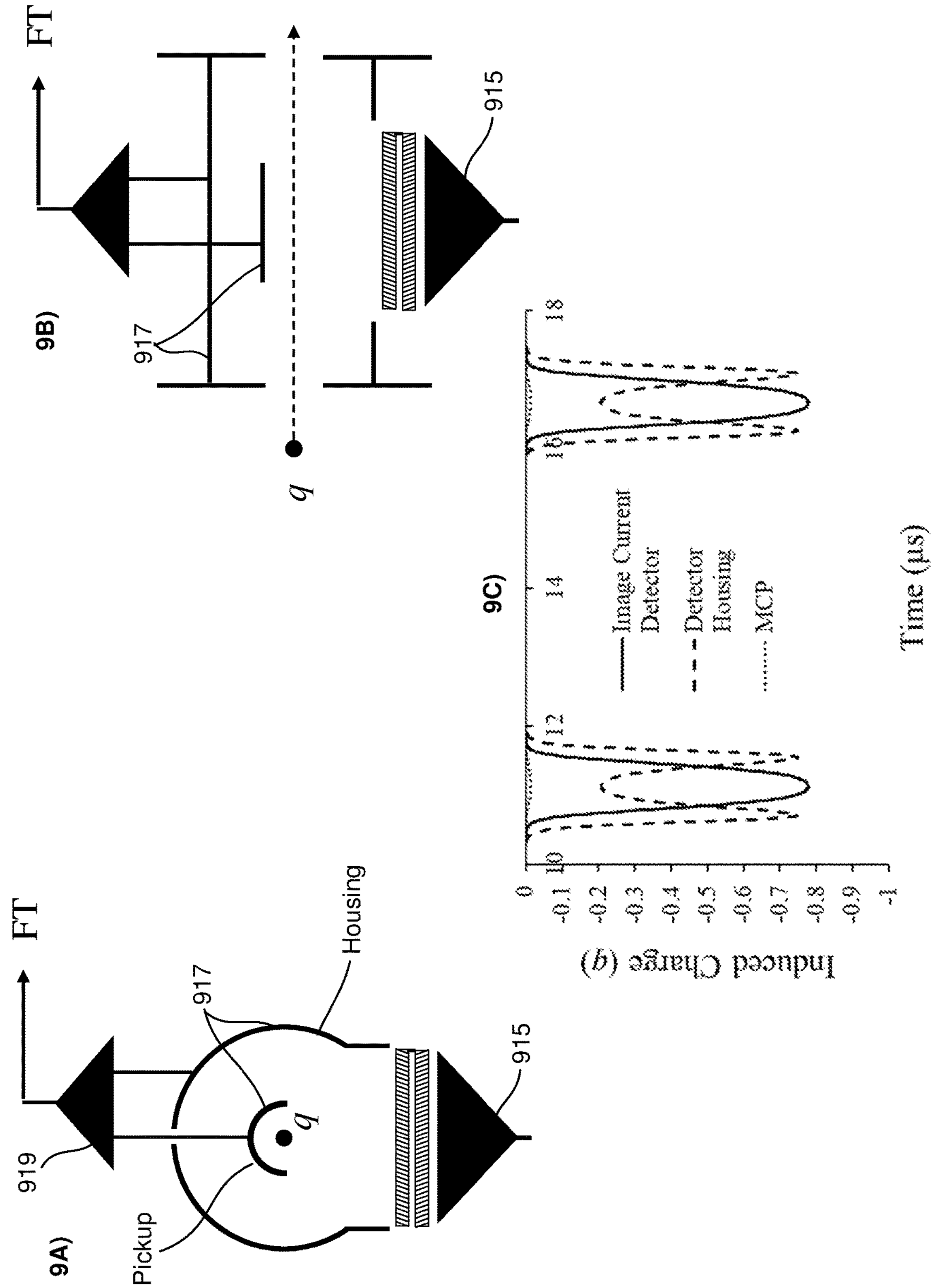
FIGS. 9A-9E illustrate a half-tube image current detector and a flat plate detector with a simulation of resulting induced charge, in accordance with an example embodiment of the disclosure.

FIGS. 9A-9E illustrate a half-tube image current detector and a flat plate detector with a simulation of resulting induced charge, in accordance with an example embodiment of the disclosure. FIG. 9A illustrates a cross-sectional view of the image current detector 917, with the perspective being from the ion path point-of-view, coupled to amplifier 919. There is also shown detector 915, which may comprise an electron multiplier such as a CEM or MCP detector, for example. The ion is represented by "q" centered in the image current detector 917. FIG. 9B shows a cross-sectional view from the side of the image current detector 917, perpendicular to the ion path, represented by the dashed line and shows detector 915 within an opening in the bottom plate of the image current detector 917. With the placement of the detector 915 on the side of the ion axis, the detector 915 is therefore not a terminal element in the mass spectrometer and surface-induced dissociation photo/electron fragmentation is enabled.

As shown in FIG. 9A, the image current detector 917 comprises a cylindrical housing with an opening towards the plate detector and a half-tube pickup also with an open side oriented towards the plate detector 915, providing increased area of the pickup of the image current detector 917 at the same distance to the center axis.

Figure 9D:
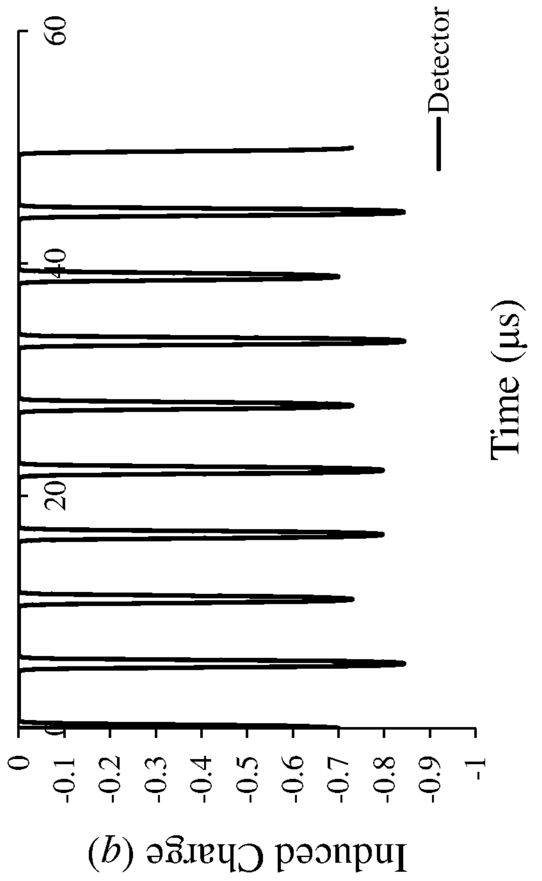
Figure 9E:
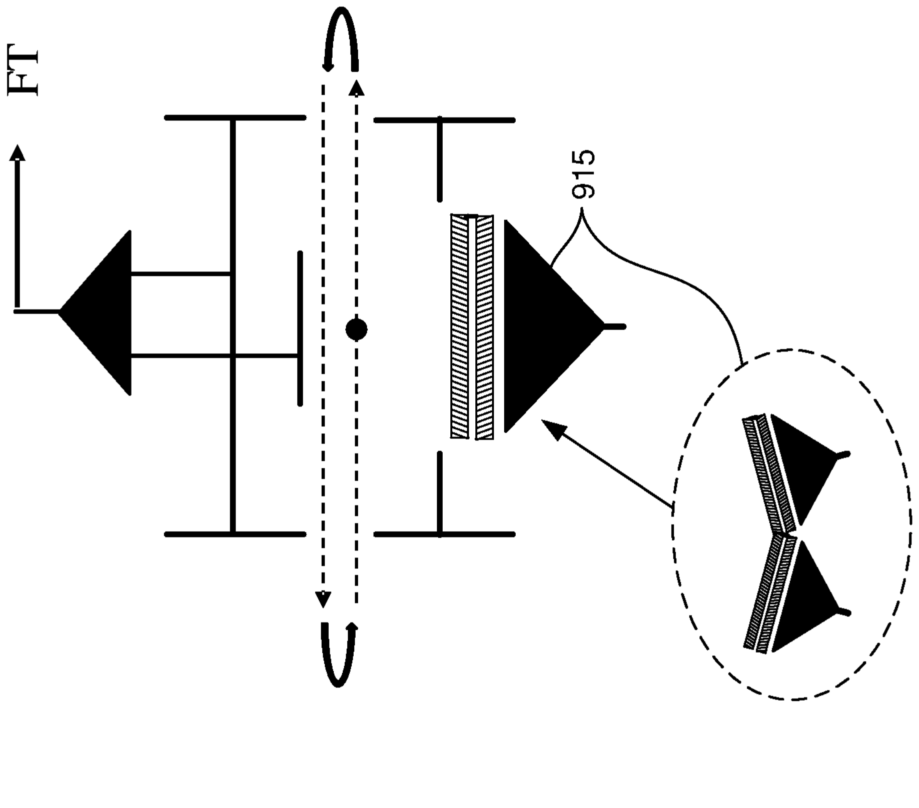

When a fully cylindrical image current detector pickup is swapped for a half-tube detector, in this case with an 8.25 mm inner diameter, 1.25 mm thick, 15 mm long, and spaced 4.125 mm from the ion axis, the induced signal drops by only ~22% over that of the conventional cylindrical pickup tube. In this configuration, only ~1% of the image charge is induced on the MCP detector 915. When the ion is allowed some radial energy in the simulation, as shown in FIG. 9D, the induced image charge can vary between 15-20% from pass to pass, as shown by the varying peak heights in FIG. 9E. In another example embodiment, the detector 915 may comprise two elements, as shown in the inset of FIG. 9D, such that each element is slanted at an off-normal angle to accept ions from a different direction traveling along the axis of the ELIT, thereby reducing the deflection angle requirements.

Figures 10A, 10B, 10C:
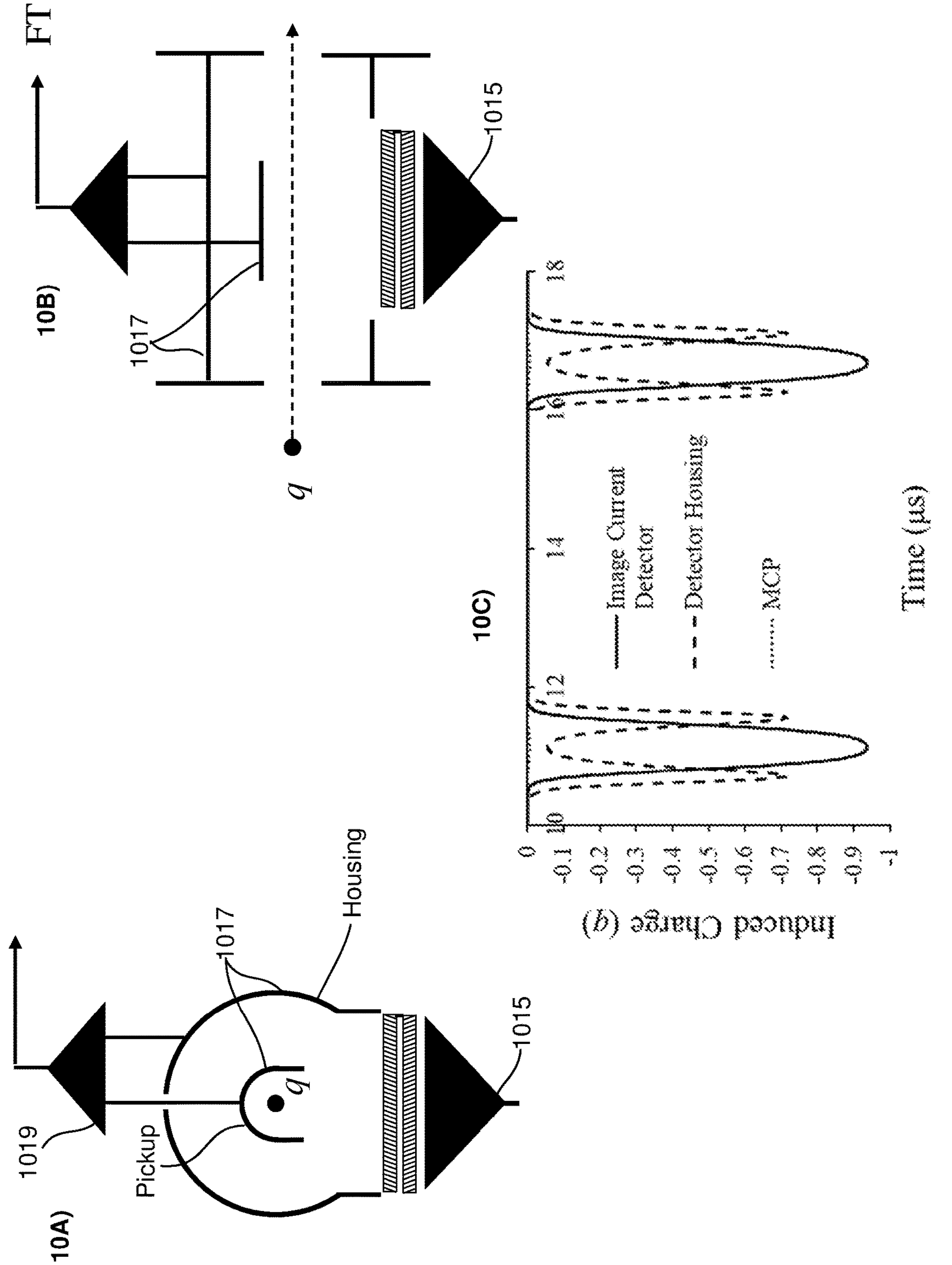
FIGS. 10A-10E illustrate a U-shaped image current detector and a flat plate detector with simulations of resulting induced charge, in accordance with an example embodiment of the disclosure.

FIGS. 10A-10E illustrate a U-shaped image current detector and a flat plate detector with simulations of resulting induced charge, in accordance with an example embodiment of the disclosure. FIG. 10A illustrates a cross-sectional view of the image current detector 1017, with the perspective being from the ion path point-of-view, coupled to amplifier 1019. There is also shown detector 1015, which may comprise an electron multiplier such as a CEM or MCP detector, for example. The ion is represented by "q" centered in the image current detector 1017. FIG. 10B shows a cross-sectional view from the side of the image current detector 1017, perpendicular to the ion path, represented by the dashed line and shows detector 1015 within an opening in the bottom plate of the image current detector 1017 housing. With the placement of the detector 1015 on the side of the ion axis, the detector 1015 is therefore not a terminal element in the mass spectrometer and surface-induced dissociation photo/electron fragmentation is enabled.

As shown in FIG. 10A, the pickup of the image current detector 1017 comprises a U-shape with the open side oriented towards the plate detector 1015, providing increased area of the image current detector pickup near the ion path.

While the fully cylindrical detector may provide the highest surface area near the ion path compared to other shapes, it is also an objective to maintain the ability to deflect the ion beam towards the detector 1015 using the voltages supplied to the detector 1015 and image current detector 1017 (either one independently, or both). In the example of FIGS. 10A-10E, a fully cylindrical detector pickup is replaced with a U-shaped pickup, comprising a half-tube detector with the sides extended downwards, by 4.25 mm in this case.

Figures 10D, 10E:
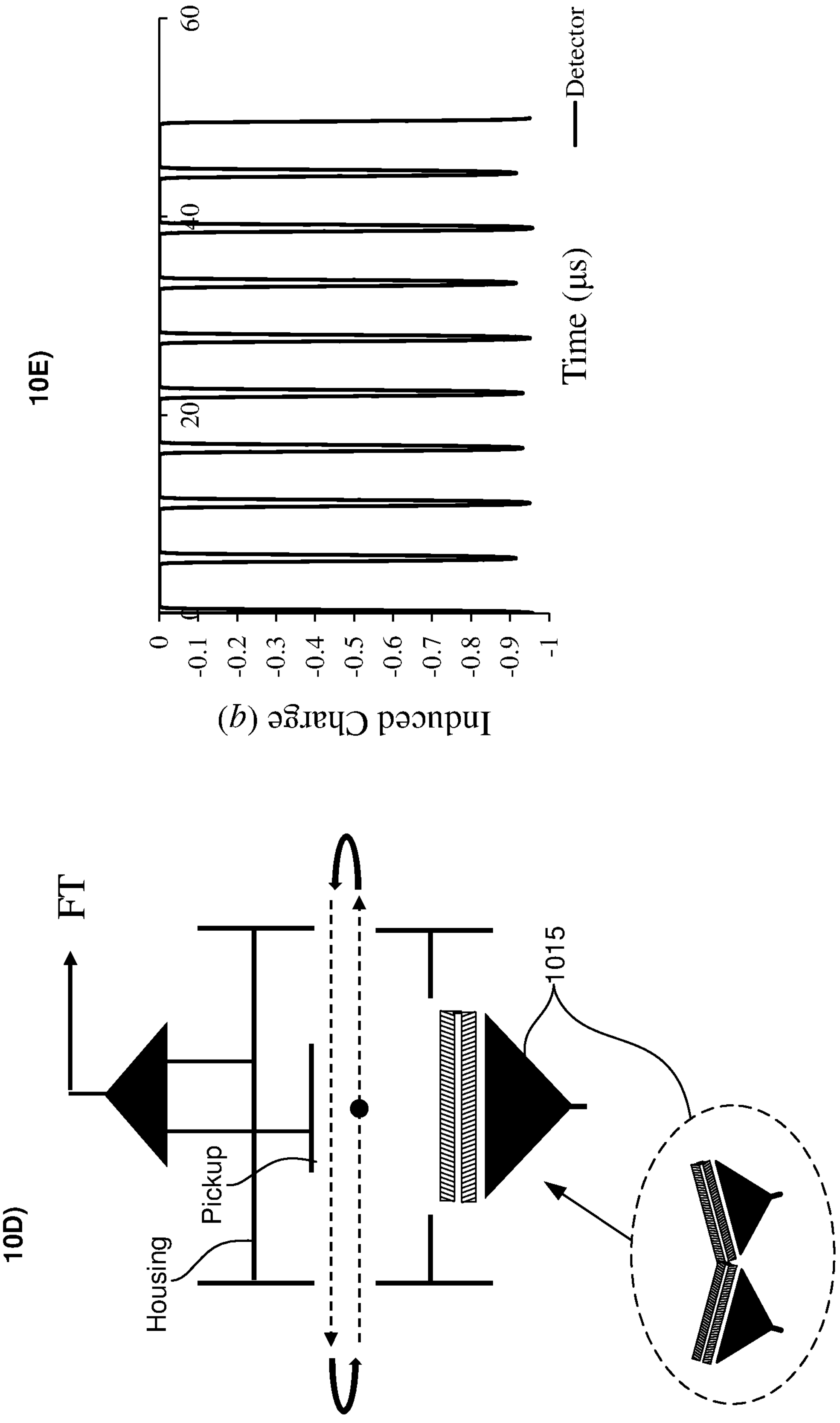

As shown in FIG. 100, the induced signal drops by only ~6%, over that of the conventional cylindrical pickup tube with only ~0.5% of the image charge is induced on the MCP detector 1015. FIG. 10D illustrates radial energy in the ion paths, as with ions trapped in the ELIT, oscillating back and forth, resulting in multiple peaks in the induced charge plot, as shown in FIG. 10E. When the ion is allowed some radial energy, the induced image charge can vary between 4-6%, as shown in FIG. 10E, which is significantly better than the half-tube of FIGS. 9A-9E. In this configuration, the signal may be much less dependent on the ion radial position, while maintaining high induced image charge and the ability to deflect the ion beam towards the plate detector 1015. In another example embodiment, the detector 1015 may comprise two elements, as shown in the inset of FIG. 10D, such that each element is slanted at an off-normal angle to accept ions from a different direction traveling along the axis of the ELIT, thereby reducing the deflection angle requirements. Those skilled in the art will appreciate that many other detector geometries are possible for the electron multiplier and the image current detector, with those shown here chosen as examples.

Figures 11A, 11B, 11C:
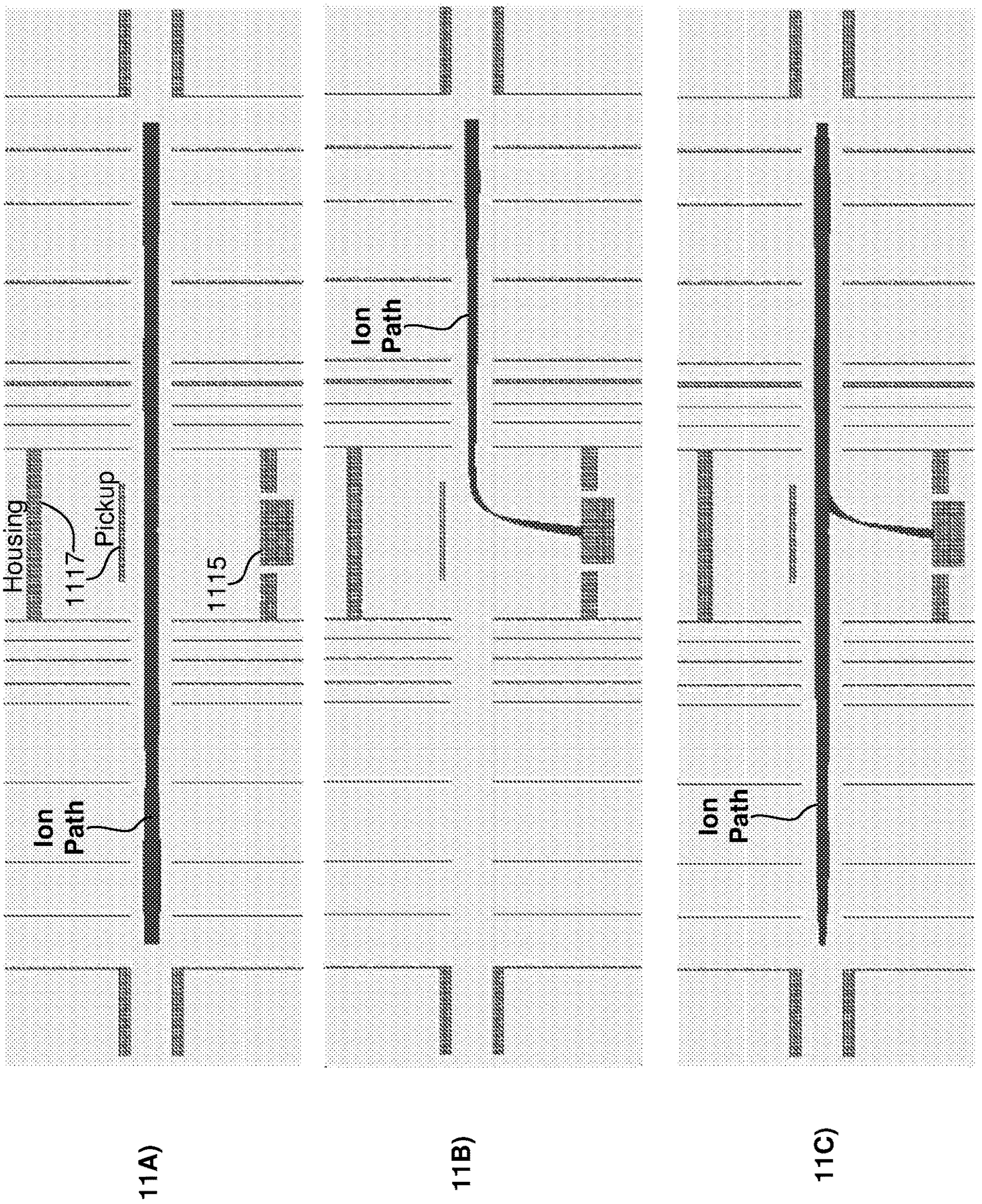
FIGS. 11A-11C illustrate beam deflection simulations, in accordance with an example embodiment of the disclosure.

FIGS. 11A-11C illustrate beam deflection simulations, in accordance with an example embodiment of the disclosure. To illustrate that it is possible to deflect ions into a plate detector using the U-shaped pickup in an image current detector shown in FIGS. 10A-10E, a full ELIT may be simulated with ions being born at uniformly distributed radial positions. Simply by changing the voltages applied to the image current detector 1117 and plate detector 1115 relative to the central housing, ions may be trapped in the ELIT, as shown in FIG. 11A; deflected for FT analysis as they enter the ELIT, for TOF analysis or instrument tuning, as shown in FIG. 11B; or deflected after a set time for MR-TOF, as shown in FIG. 11C.

In the images, a voltage may be placed on the image current detector to deflect ions into the plate detector. This voltage may not be needed if the electron multiplier, such as an MCP, is floated to a sufficiently attractive voltage. Note that even though FIG. 11C only includes two reflections, and ions are born at the exact same time, the arrival time distribution of the ions already spans nanoseconds to tens of nanoseconds. As such, this mode of operation is most useful for instrument tuning and determining the sensitivity of the image charge detection electronics, although it can certainly also be used for low resolution TOF or MR-TOF applications.

Figure 12:
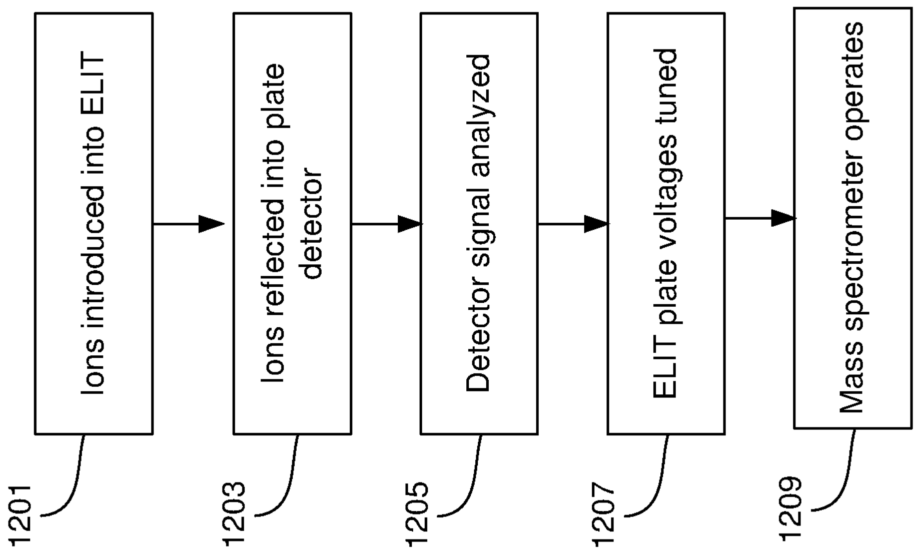
FIG. 12 is a flow diagram for tuning an electrostatic ion trap using ions deflected to a plate detector, in accordance with an example embodiment of the disclosure.

FIG. 12 is a flow diagram for tuning an electrostatic ion trap using ions deflected to a plate detector, in accordance with an example embodiment of the disclosure. Referring to FIG. 12, the process begins in step 1201 where ions may be introduced to the ELIT. In an example scenario, the plates of the ELIT may be biased to trap ions in the ELIT. In step 1203, voltages on the plate detector and image current detector may be configured to deflect ions to the plate detector followed by step 1205 where the signal on the plate detector is analyzed. In step 1207, if the signal analyzed in step 1205 shows a single peak where two are expected, the ELIT plate voltages may be adjusted. Once adjusted, the process continues with step 1209, where the mass spectrometer measures desired analytes, with the plate detector used for low resolution TOF or MR-TOF applications if desired.

A system and/or method implemented in accordance with various aspects of the present disclosure, for example, provides an electrostatic linear ion trap (ELIT) comprising a central axis along which ions travel; an image current detector disposed at least partially around the central axis of the ELIT; and an electron multiplier detector, for example a microchannel plate detector arranged in an opening of the image current detector, the microchannel plate detector being operable to receive ions deflected from the central axis.

The electron multiplier detector, for example a microchannel plate detector, may have a front surface that is perpendicular to the central axis of the ELIT. The electron multiplier, such as a microchannel plate detector, may comprise two separate elements at non-normal angles to the central axis of the ELIT. The image current detector may comprise a cylinder with the opening on one side in which the microchannel plate detector is arranged. The image current detector may comprise a U-shape. The image current detector may comprise a half-tube detector. The image current detector may comprise an extended half-tube detector. The ELIT may be operable to dissociate ions at an exit end of the ELIT for detection by the microchannel plate detector or image current detector. The microchannel plate detector may be arranged midway between an inlet and an outlet of the ELIT. The ELIT may be operable to pass ions not deflected to the microchannel plate detector to subsequent optics. A focusing element may be situated between the image current detector and the microchannel plate detector.

While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A mass spectrometer system comprising: an electrostatic linear ion trap (ELIT) comprising a central axis along which ions travel; an image current detector disposed at least partially around the central axis of the ELIT; and an electron multiplier detector arranged in an opening of the image current detector, the electron multiplier detector being operable to receive ions deflected from the central axis and wherein the electron multiplier detector has a front surface that is perpendicular to the central axis of the ELIT.

2. The mass spectrometer system according to claim 1, wherein the electron multiplier detector comprises one of a microchannel plate (MCP) and a channel electron multiplier (CEM).

3. The mass spectrometer system according to claim 1, wherein the image current detector comprises a cylinder with the opening on one side in which the electron multiplier detector is arranged.

4. The mass spectrometer system according to claim 1, wherein the image current detector comprises a U-shape.

5. The mass spectrometer system according to claim 1, wherein the image current detector comprises a half-tube detector; or wherein the image current detector comprises an extended half-tube detector.

6. The mass spectrometer system according to claim 1, wherein the ELIT is operable to dissociate ions at an exit end of the ELIT for detection by the electron multiplier detector or image current detector.

7. The mass spectrometer system according to claim 1, wherein the electron multiplier detector is arranged midway between an inlet and an outlet of the ELIT.

8. The mass spectrometer system according to claim 1, wherein the ELIT is operable to pass ions not deflected to the electron multiplier detector to subsequent optics.

9. The mass spectrometer system according to claim 1, wherein a focusing element is situated between the image current detector and the electron multiplier detector.

10. A method for mass spectrometry, the method comprising: in an electrostatic linear ion trap (ELIT) comprising an image current detector disposed at least partially around a central axis of the ELIT and an electron multiplier detector arranged in an opening of the image current detector: introducing ions into the ELIT; and deflecting at least a portion of the ions into the electron multiplier detector and wherein the electron multiplier detector has a front surface that is perpendicular to the central axis of the ELIT.

11. The method according to claim 10, wherein the electron multiplier detector comprises one of a microchannel plate (MCP) and a channel electron multiplier (CEM).

12. The method according to claim 10, comprising measuring a charge on the image current detector due to the ions traveling along the central axis.

13. The method according to claim 10, wherein the image current detector comprises a cylinder with the opening on one side in which the electron multiplier detector is arranged.

14. The method according to claim 10, wherein the image current detector comprises a U-shape; or wherein the image current detector comprises a half-tube detector.

15. The method according to claim 10, comprising dissociating ions at an exit of the ELIT for detection by the electron multiplier detector or image current detector.

16. The method according to claim 10, wherein the electron multiplier detector is arranged midway between an inlet and an outlet of the ELIT.

17. The method according to claim 10, comprising passing ions not deflected to the electron multiplier detector to optics that are subsequent to the ELIT.

18. The method according to claim 10, comprising focusing ions onto the electron multiplier detector using a focusing element located between the image current detector and the electron multiplier detector.

19. A mass spectrometer system comprising: an electrostatic linear ion trap (ELIT) comprising a central axis along which ions travel; an image current detector disposed at least partially around the central axis of the ELIT; and an electron multiplier detector arranged in an opening of the image current detector, the electron multiplier detector being operable to receive ions deflected from the central axis and wherein the electron multiplier detector comprises two separate elements at non-normal angles to the central axis of the ELIT.

20. The mass spectrometer system according to claim 19, wherein the electron multiplier detector comprises one of a microchannel plate (MCP) and a channel electron multiplier (CEM).

21. The mass spectrometer system according to claim 19, wherein the image current detector comprises a cylinder with the opening on one side in which the electron multiplier detector is arranged.

22. The mass spectrometer system according to claim 19, wherein the image current detector comprises a U-shape.

* * * * *